UNITED STATES PATENT OFFICE.

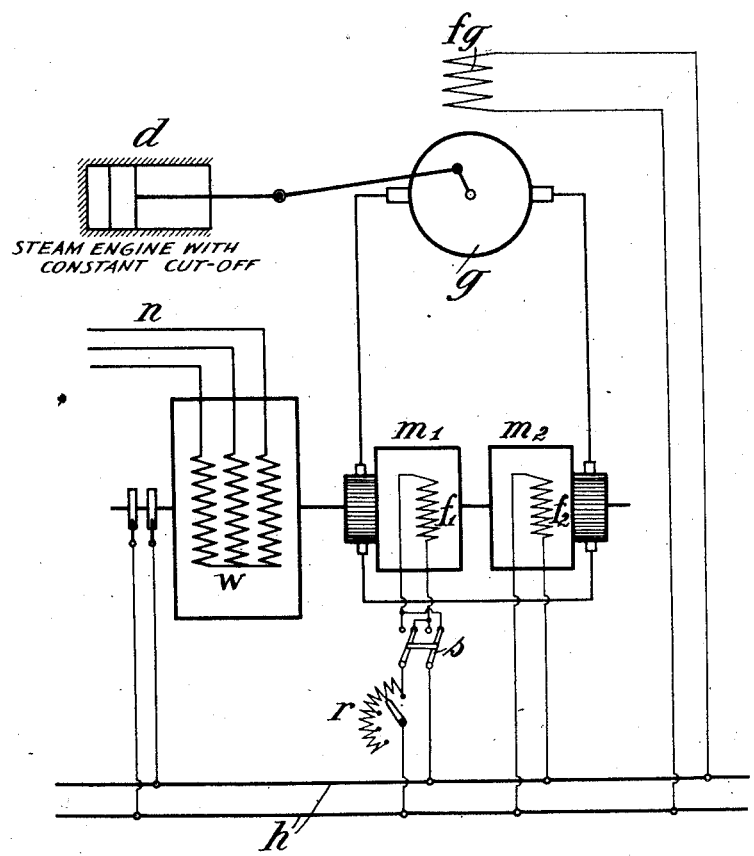

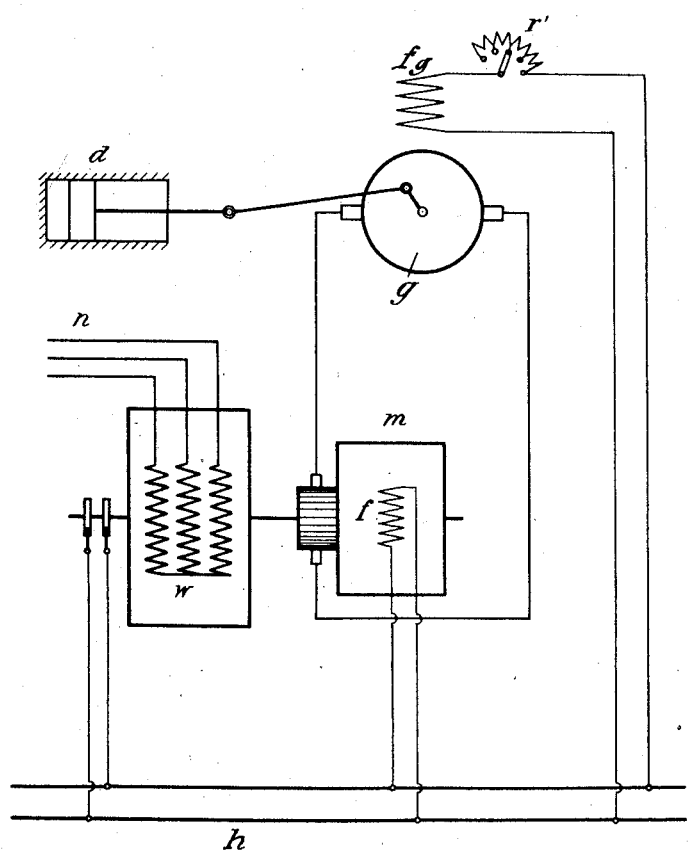

CARL TRETTIN, OF BERLIN, GERMANY, ASSIGNOR TO SIEMENS-SCHUCKERTWERKE G. M. B. H., OF BERLIN, GERMANY, A CORPORATION OF GERMANY.

APPARATUS FOR CONVERTING HEAT ENERGY.

1,187,795.  Specification of Letters Patent.  Patented June 20, 1916.

Application filed October 31, 1913. Serial No. 798,578.

*To all whom it may concern:*

Be it known that I, CARL TRETTIN, a German citizen, and resident of Berlin, Germany, have invented certain new and useful Improvements in Apparatus for Converting Heat Energy, of which the following is a specification.

This invention relates to a novel apparatus for converting the energy which is set free by a temperature gradient between a higher and a lower temperature and for commercially utilizing this energy and converting the same into electric energy.

The object of my invention in brief is to utilize steam energy between given temperature limits at the highest possible efficiency. In heating plants frequently the problem arises to convert steam of a definite higher temperature into working steam of a lower temperature. In order to economically carry on this conversion the energy represented by the available temperature gradient is utilized for driving a steam engine by the aid of intermediate electrical machinery which feeds electrical energy into the mains of an electric power system. By this invention, now, the quantity of the steam used may be regulated in a simple and expeditious manner. If the cut-off of the steam engine is kept constant, its torque will also remain constant and the regulation of the quantity of steam will be effected by solely regulating the speed of the steam engine. This mode of regulation has the advantage that by reason of the steam-diagram remaining unchanged, the working steam is always kept at the same temperature. In this case steam regulating devices are not required, the quantity of steam being varied by regulating the electric machinery.

The invention is illustrated in the annexed drawings, in which:

Figure 1 shows a modification in which the speed of the steam engine is varied by regulating the field of one of the motors, and Fig. 2 shows a modification in which the field of the steam engine driven generator is regulated for the purpose of speed control.

My invention will be more fully understood by reference to the accompanying drawing which shows in diagrammatic view one form of apparatus for carrying my present invention into effect.

The alternating current generator $w$ for supplying energy to the alternating current line is driven by two continuous current motors $m_1$ and $m_2$ which are coupled to each other and fed by the continuous current generator $g$ in series over the commutators thereof as shown in the drawing. The continuous current generator $g$ is directly driven by the steam engine $d$ and the speed of the alternating current generator $w$ supplying the three-phase alternating current line $n$ will be kept constant by the synchronizing force exerted by the latter, while the speed of the steam engine $d$ may be varied by regulating the field $f_1$ of one motor $m_1$ of the motor-couple by means of a regulating resistance $r$ inserted in series with said field $f_1$. The field $f_1$ of the motor $m_1$ now may be regulated by an increase or decrease in field strength and this in either sense of the direction of its magnetic lines, that is to say, the field strength of the motor $m_1$ may be decreased down to zero and thereupon reversed and again be increased in opposite sense and vice versa. Thus by the former way of regulating, the motor $m_1$, for instance, may act additively to the electromotive force of the circuit formed by the generator $g$ and the motor-couple $m_1$ and $m_2$, while by the latter mode of regulation it may act subtractively from this electromotive force. I have represented the apparatus for performing this operation by a resistance $r$ and a reversing switch $s$ for manual operation in the proper manner, it must be understood, however, that a more superior device in the form of a combined resistance and a reversing switch may be employed. The continuous current source supplying the current for the excitation of the alternating current generator is designated by $h$.

If the steam engine is intended to furnish energy for feeding into alternating current mains, I may employ commutating machinery for converting the variable frequency of the generator, driven by the steam engine, into the constant frequency of the alternating current net works. I have found however, that essential advantages are obtained in case an arrangement is employed by which continuous current motors can be regulated within a large range of speed. Thus for instance, a steam engine may be used for driving a direct current generator whose armature terminals are connected with a couple of motors according to a modified Ward-Leonard system, wherein the motors in turn are coupled mechanically and also electrically and are controlled in the manner described above. These motors in turn drive the alternating current generator of constant speed which in turn feeds the alternating current net work. In order to be able to use the steam engine for feeding energy into the alternating current net work, also other arrangements may be used, for instance those in which the commutator machines serve the purpose of converting the variable frequency of the generator, which is operated by the steam engine, into the constant frequency of the alternating current net. With particular advantage the arrangements may be used which are known as the Ward-Leonard system. In Fig. 2 an example thereof is illustrated. In this figure $d$ represents again the steam engine, $g$ the generator which drives the direct current motor $m$. This motor is coupled with an alternating current generator $w$ which feeds into the mains $n$. The necessary energy for the excitation is furnished from the direct current mains $h$. While the field $f$ of the motor $m$ may have constant excitation, the field $f, g$ of the generator is controlled through a resistance $r'$ for the purpose of controlling the alternating current energy. Thus also the steam engine may be controlled by these means, whereas for the motor the constant speed is obtained which is necessary for driving the alternating current generator $w$.

The advantage of the apparatus described and illustrated herein consists in an especially good utilization of the electrical machinery, which is due to the characteristics of the above described modified Ward-Leonard drive.

Having thus described my invention I do not wish to limt myself to the arrangement herein shown and described, since modifications may be made thereon without departing from the principle of my invention.

I therefore claim as new and desire to secure by Letters Patent of the United States:—

1. Apparatus for converting heat energy into electrical energy, comprising a heat prime mover with constant cut-off, an electric generator, and means for varying the speed of said prime mover at constant speed of said generator.

2. Apparatus for converting heat energy into electrical energy, comprising a heat prime mover with constant cut-off, an electric generator, and dynamo-electric means interposed between said prime mover and said generator, said dynamo-electric means being adapted to permit variation of the speed of said prime mover at constant speed of said generator.

3. Apparatus for converting heat energy into electrical energy, comprising a heat prime mover with constant cut-off, an electric generator driven thereby, electric motor means electrically supplied from said generator, a second generator driven by said motor means and connected to an electric line, and an electric regulating device for the circuit formed by said first generator and said motor means for obtaining a variable speed relation between the former and the latter.

4. Apparatus for converting heat energy into electrical energy, comprising a heat prime mover with constant cut-off, an electric generator driven thereby, electric motor means electrically supplied from said generator, an alternating current generator driven by said motor means and connected to an alternating current line of given frequency, and a regulator for said motor means permitting constant speed of the latter and variable speed of the first-mentioned generator.

5. Apparatus for converting heat energy into electrical energy, comprising a heat prime mover with constant cut-off coupled to a dynamo-electric generating device feeding the mains of a supply circuit, with regulating means for regulating the energy supply to said prime mover so as to operate under variable speed and constant torque, said regulating means being adapted to influence the speed of said prime mover by the electrical regulation of said generating device.

6. Apparatus for converting heat energy into electrical energy, comprising a heat prime mover with constant cut-off, a dynamo-electric device driven by said prime mover, regulating means associated with said dynamo-electric device and permitting regulation of the supply to said prime mover by variation of its speed at constant torque.

7. Apparatus for converting heat energy into electrical energy, comprising a heat prime mover with constant cut-off, a continuous current generator driven thereby, a couple of geared continuous current motors supplied from said generator in series to each other, switching instrumentalities for causing said motors to work either additively or subtractively with respect to each other, an alternating current generator driven from said motor-couple, and electrical regulating means for varying the speed ratio between said first-mentioned generator and said motor-couple.

8. Apparatus for converting heat energy into alternating current electrical energy of constant frequency, comprising a heat prime mover with constant cut-off, a continuous current generator driven thereby, a pair of coupled continuous current motors supplied in series from said continuous current generator, regulating means for one of said motors for causing the same to set additively to or subtractively from the voltage of said continuous current generator, and an alternating current generator driven by said motors and connected to an alternating current line of constant frequency.

9. Apparatus for converting heat energy into electrical energy, comprising a heat prime mover with constant cut-off, a continuous current generator driven thereby, a couple of continuous current motors which are mechanically geared to each other, the armatures of said motor-couple being connected in series with each other and in series with the armature of said generator, an alternating current generator driven by said motor-couple, means for regulating the field strength of one motor of said couple, permitting variable speed of said continuous current generator at constant speed of said motor-couple.

In witness whereof I have hereunto set my signature in the presence of two subscribing witnesses.

CARL TRETTIN.

Witnesses:
 KARL GEORG FRANK,
 A. EISENHARDT.